Aug. 11, 1931.    R. M. KERR    1,818,627
INSTRUMENT FOR TREATING TEETH
Filed Jan. 21, 1929
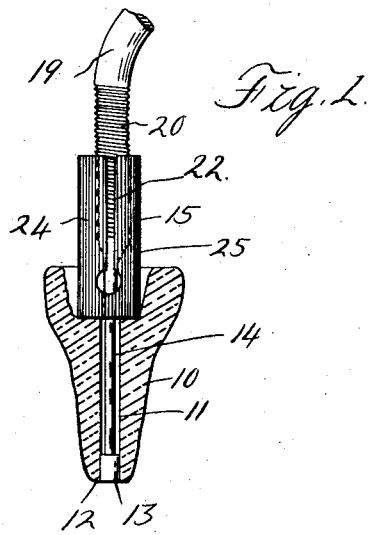
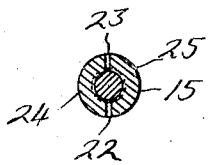
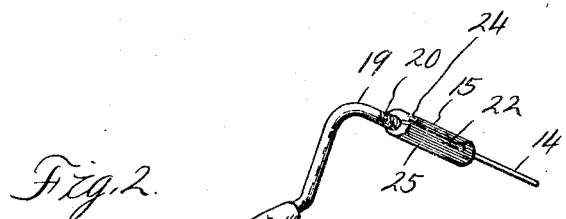
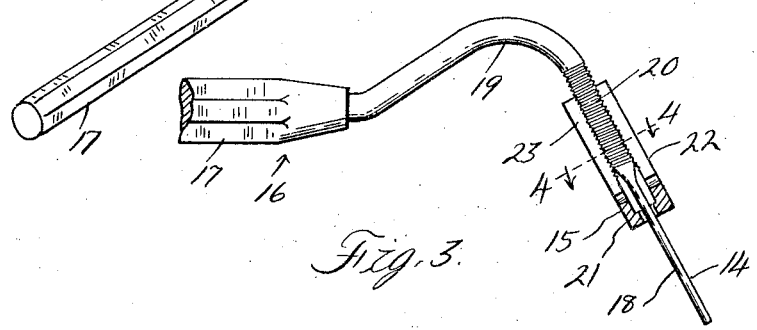
INVENTOR
Robert M. Kerr
BY
ATTORNEYS Patented Aug. 11, 1931

1,818,627

UNITED STATES PATENT OFFICE

ROBERT M. KERR, OF DETROIT, MICHIGAN, ASSIGNOR TO DETROIT DENTAL MANUFACTURING COMPANY, OF DETROIT, MICHIGAN, A CORPORATION OF MICHIGAN

INSTRUMENT FOR TREATING TEETH

Application filed January 21, 1929. Serial No. 333,971.

The invention relates generally to dentistry and more particularly to a method as well as an instrument for filling the root canals of teeth as will be more fully hereinafter set forth.

In the drawings illustrating the invention:

Figure 1 is a semi-diagrammatic sectional view through a tooth illustrating the method of filling the root canal of the tooth;

Figure 2 is a perspective view of a dental instrument constructed in accordance with the teachings of this invention;

Figure 3 is an elevational view partly in section of the instrument shown in Figure 2; and Figure 4 is a sectional view taken substantially on the line 4—4 of Figure 3.

In root canal work it is essential that the material while entirely filling the canal shall not be extended beyond the latter with resulting injury to the gum. The present invention contemplates, therefore, a method by which the root canal may be entirely filled and this without possibility of extending the material beyond the canal end.

The numeral 10 designates a tooth having a canal 11, the apex of which is indicated by the numeral 12 and beyond which the filling should not be forced. In carrying out the method the canal is filled with a plurality of sections of filling material, one being shown in place in the canal and designated by the numeral 13. In positioning the first section of the filler the length of the canal is first determined, subsequently the length of one of the filler sections and the difference between these lengths computed. This difference determines the distance that the top of the section of filling should be from the top of the canal when the section is properly in position within the canal with its lower end flush with the apex.

The method contemplates the use of a ram or similar member 14 having an operative length equal to this distance. This length may be regulated by suitable gauge or stop 15 engageable with the tooth top when the ram is fully inserted into the root canal. If, therefore, the section of filling is pressed slowly but firmly into the root canal by the ram member until the gauge contacts with the top of the tooth, the section of filling will be accurately positioned in the base of the canal with its lower surface flush with the apex of the canal.

Obviously a second section of filling material may be accurately positioned in the canal on top of the first piece by measuring the length of the unfilled portion of the canal, measuring the length of the section of filling, and then adjusting the operative length of the ram member to the difference between these two lengths. Thus when the second piece of filling is forced into the canal with a ram member of the correct operative length, contact of the gauge with the top of the tooth will prevent the forcing of the first piece of filling beyond the end of the canal by the second piece.

In Figure 2 to 4 inclusive, there is disclosed an instrument designed particularly for carrying out the above described method. In these views, the reference character 16 designates generally an elongated member having a handle portion 17 and a tool portion 18. As illustrated, the tool and handle may be integrally united by a suitable shank 19. The tool is provided at a point spaced from its free end with the threaded portion 20 adapted to be threadedly engaged by a sleeve 21. In order that the sleeve will not work loose after the same has been properly adjusted, it is formed of resilient material and is slit longitudinally as at 22 and 23 for a major portion of its length. These slits form the sections 24 and 25 which may be pressed together before the sleeve is threaded on the tool so that the normal inner diameter of the sleeve is less than the diameter of the threaded portion of the tool. Obviously threading of the sleeve on the tool will vary the operative length of the tool and the sleeve will be clamped in adjusted position by the resiliency of the portions 24 and 25.

The tool forms the ram member by which the section of filling is applied. The sleeve forms a gauge or stop limiting the distance to which the tool may be inserted, and this sleeve may be adjusted to vary the operative length of the tool in the manner above described.

What I claim as my invention is:

1. A dental instrument comprising an elongated member having one portion forming a handle and a second portion forming a tool adapted to be inserted into the root canal of a tooth, said member being threaded intermediate its ends, and a sleeve threadedly engageable with the threaded portion of said member for regulating the operative length of said tool.

2. A dental instrument comprising a plugging tool having a threaded portion spaced from its free end, and a sleeve threadedly engageable with the threaded portion of said tool for regulating the operative length of the tool.

3. A dental instrument comprising a plugging tool, said tool being threaded at a point spaced from its free end, and a resilient sleeve having a normal diameter less than the diameter of the threaded portion of said tool, said sleeve being threaded and being provided with a longitudinally extending slot whereby said sleeve is adapted to clampingly and threadedly engage the threaded portion of said tool.

4. In a dental instrument, an elongated member having a handle portion and a tool portion, and a stop member resiliently embracing the said elongated member and threadedly adjustable thereon for regulating the operative length of the tool portion of said elongated member.

5. A dental instrument comprising a tool adapted for insertion into a root canal of a tooth, said tool having a threaded portion, and a member having a resilient portion threadedly engageable with the threaded portion of said tool for adjustment longitudinally thereof, said member constituting a stop for limiting the extent of insertion of the tool into the root canal.

In testimony whereof I affix my signature.

ROBERT M. KERR.